No. 769,448. PATENTED SEPT. 6, 1904.
M. J. O'CONNOR.
SOUND CONTROLLER FOR HORNS OF PHONOGRAPHS OR GRAPHOPHONES.
APPLICATION FILED JAN. 2, 1904.
NO MODEL.
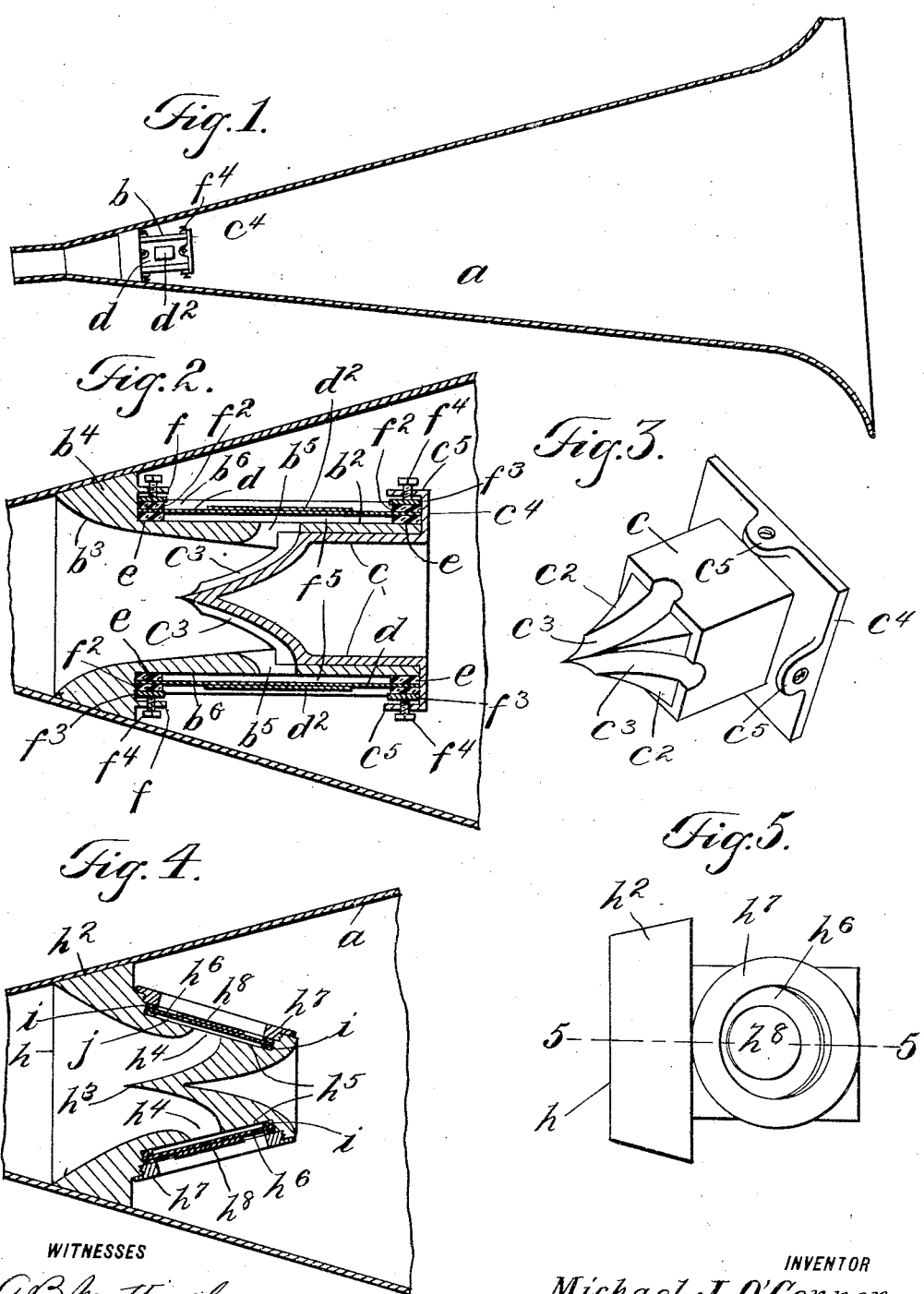
WITNESSES
INVENTOR
Michael J. O'Connor.
BY Edgar Late & Co.
ATTORNEYS No. 769,448.

Patented September 6, 1904.

UNITED STATES PATENT OFFICE.

MICHAEL J. O'CONNOR, OF BROOKLYN, NEW YORK.

SOUND-CONTROLLER FOR HORNS OF PHONOGRAPHS OR GRAPHOPHONES.

SPECIFICATION forming part of Letters Patent No. 769,448, dated September 6, 1904.

Application filed January 2, 1904. Serial No. 187,409. (No model.)

*To all whom it may concern:*

Be it known that I, MICHAEL J. O'CONNOR, a citizen of the United States, residing at Brooklyn, in the county of Kings and State of New York, have invented certain new and useful Improvements in Sound-Controllers for Horns of Phonographs or Graphophones, of which the following is a specification, such as will enable those skilled in the art to which it appertains to make and use the same.

The object of this invention is to provide an improved device for controlling the sound as it passes from the horn of a phonograph or similar machine, whereby the sound is made more distinct and the articulation more complete; and with this and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a longitudinal section of a phonograph-horn provided with my improvement; Fig. 2, a similar view showing the improvement in section; Fig. 3, a perspective view of one part of the improvement; Fig. 4, a view similar to Fig. 2, showing a modification, said Fig. 4 being a section on the line 5 5 of Fig. 5; and Fig. 5, a side view of the improvement as shown in Fig. 4.

In the drawings forming part of this specification I have shown at $a$ an ordinary phonographic horn, and in the practice of my invention I insert thereinto a sound controller and regulator $b$. The sound controller and regulator $b$ (shown in Figs. 1, 2, and 3) comprises an oblong casing or shell $b^2$, the inner end of which is bell-shaped in form, as shown at $b^3$, and provided with a beveled outer portion $b^4$, whereby it is made to closely fit the inner walls of the horn, near the smaller end thereof. The outer end of the casing or shell $b^2$ is enlarged internally, and inserted thereinto is a block $c$, which in the form of construction shown is hollow and conical at its inner end, as shown at $c^2$. In the form of construction shown the casing or shell $b^2$ and the block $c$ and the conical portion $c^2$ of said block are square or angular in cross-section, and the conical portion $c^2$ of said block is provided with grooves $c^3$ in the sides thereof which communicate with the lateral openings $b^5$ in the sides of the shell or casing $b^2$.

The outer end of the block $c$ is provided with a flange or rim $c^4$, the sides of which are provided with inwardly-directed lugs or projections $c^5$. The casing or shell $b^2$ is provided in the opposite sides with a longitudinal recess $b^6$, in each of which is placed a mica sheet $d$, the central portion of which is reinforced by a supplemental mica sheet $d^2$, and between the ends of the sheets $d$ and the bottom of the recesses $b^6$ in the sides of the casing or shell $b^2$ are placed rubber bearings $e$. The beveled portion $b^4$ of the casing or shell $b^2$ at the inner end thereof is also provided at the opposite sides of the casing or shell $b^2$ with outwardly-directed lugs or projections $f$, and placed on the ends of the sheets $d$ are rubber bearing-strips $f^2$, over which are placed metal strips $f^3$, and set-screws $f^4$ are passed through the lugs or projections $c^5$ and $f$ and bear on the metal strips $f^3$, which in turn bear on the rubber strips or bearings $f^2$, so as to securely hold the mica sheets $d$ in position, and by means of this construction a space $f^5$ is provided between the mica sheets $d$ and the casing or shell $b^2$. In practice this device is inserted into the horn $a$, as shown in Figs. 1 and 2, and the sound escaping from the horn is controlled and regulated and the articulation is made more distinct and perfect.

Although the casing or shell $b^2$ and the parts $c$ inserted thereinto are shown and described as angular in cross-section, these parts, as will be understood, may be circular in cross-section, if desired, and the inner end of the casing or shell $b^2$ in the form of construction shown is circular in cross-section at the inner side thereof.

In Figs. 4 and 5 I have shown a modification in which I employ a sound controller and regulator $h$, bell-shaped in form at the inner end and beveled at the outer side thereof, as shown at $h^2$, so as to closely fit the inner walls of the horn $a$, and the outer end thereof is conical in general form and provided with an inwardly-directed conical portion $h^3$, at the sides of which are lateral openings $h^4$, which communicate with recesses $h^5$ in the sides of the outer end of the casing or shell $h$, and in these recesses are placed mica sheets $h^6$, held in place by collars $h^7$, screwed into said recesses. In this form of construction the casing or shell $h$ is integral or composed of one part, and the recesses $h^5$ in the sides thereof are circular in form, as are also the mica sheets $h^6$, and said mica sheets $h^6$ are also reinforced by supplemental mica sheets $h^8$, placed centrally of the outer side thereof. It will be observed that in both forms of construction the supplemental mica sheets $d^2$, as shown in Figs. 1 and 2, and $h^8$, as shown in Figs. 4 and 5, are of less dimensions than the main mica sheets $d$ and $h^6$, on which they are placed, and the vibrations of the mica sheets $d$ and $h^6$, occasioned by the sound-waves striking on the inner sides thereof, control and regulate said sound, as hereinbefore described. The mica sheets $h^6$ are also held in place by rubber strips or bearings $i$ at the opposite ends thereof, between which said mica sheets are placed, and between the mica sheets $h^6$ and the bottoms of the recesses in which they are placed are spaces $j$, similar to the spaces $f^5$ in the form of construction shown in Fig. 2.

As thus constructed it will be seen that my improvement comprises a device adapted to be inserted into the horn of a phonograph or similar instrument for the purpose herein specified, said device comprising a main part or shell bell-shaped at its inner end and the outer end of which is provided with a supplemental member having a conical inner end, the main part or shell being provided in the sides thereof with lateral openings adjacent to the base of the conical inner end of the supplemental part and which communicate with recesses in the outer side walls of the main part or shell, in which are placed mica plates or disks, between which and the main part or shell are spaces adapted to receive sound-waves passing outwardly through said openings, and it will be apparent that various changes in and modifications of the construction herein described may be made without departing from the spirit of my invention or sacrificing its advantages.

Although I have described the sheets or disks $d$ and $h^6$ as composed of mica, it will be understood that these disks or sheets are vibratory in character and may be composed of any material which will accomplish the desired results, and my invention is not limited to the use of the supplemental sheets or disks $d^2$ and $h^8$, as in some cases the sheets or disks $d$ and $h^6$ may be found to operate satisfactorily without said supplemental sheets or disks.

Having fully described my invention, what I claim as new, and desire to secure by Letters Patent, is—

1. A sound controller and regulator adapted to be inserted into the horn of a phonograph or similar instrument, and comprising a main part or casing bell-shaped in form at its inner end and provided at its outer end with an inwardly-directed conical member at the sides of which are lateral openings which communicate with recesses or chambers formed in the sides of the outer shell or member, and vibratory sheets or disks secured in said recesses or chambers, substantially as shown and described.

2. A sound controller and regulator adapted to be inserted into the horn of a phonograph or similar instrument, and comprising a main part or casing bell-shaped in form at its inner end and provided at its outer end with an inwardly-directed conical member at the base of which are lateral openings which communicate with chambers or recesses in the sides of the main part or casing, and vibratory sheets or disks placed in said recesses or chambers, said sheets or disks being supported between rubber or similar bearings, substantially as shown and described.

3. A sound controller and regulator adapted to be inserted into the horn of a phonograph or similar instrument, and comprising a main part or casing bell-shaped in form at its inner end, a supplemental part inserted into the outer end thereof and cone-shaped in form at its inner end, the cone-shaped part being provided with side grooves which communicate with openings in the sides of the main part or casing, said sides of the main part or casing being also provided with chambers or recesses with which said openings communicate, and vibratory sheets or disks secured in said chambers or recesses, substantially as shown and described.

4. A sound controller and regulator adapted to be inserted into the horn of a phonograph or similar instrument, and comprising a main part or casing bell-shaped in form at its inner end, a supplemental part inserted into the outer end thereof and cone-shaped in form at its inner end, the cone-shaped part being provided with side grooves which communicate with openings in the sides of the main part or casing, said sides of the main part or casing being also provided with chambers or recesses with which said openings communicate, and vibratory sheets or disks secured in said chambers or recesses, and provided with reinforcing sheets or disks arranged centrally thereof, substantially as shown and described.

5. A sound controller and regulator adapted to be inserted into the horn of a phonograph or similar instrument and closed at its outer end, the inner end of said controllor or regulator being open and the sides thereof provided with openings, the outer sides of the controller and regulator being provided with chambers or recesses with which said openings communicate and vibratory devices secured in said chambers or recesses, substantially as shown and described.

In testimony that I claim the foregoing as my invention I have signed my name, in presence of the subscribing witnesses, this 31st day of December, 1903.

MICHAEL J. O'CONNOR.

Witnesses:
F. A. STEWART,
C. E. MULREANY.